(12) United States Patent
Luo et al.

(10) Patent No.: US 10,465,618 B1
(45) Date of Patent: Nov. 5, 2019

(54) MICROWAVE ENHANCED COMBUSTION WITH DYNAMIC FREQUENCY, POWER, AND TIMING CONTROL AND WITH POWER SENSOR FOR POWER FEEDBACK

(71) Applicant: Southwest Research Institute, San Antonio, TX (US)

(72) Inventors: Yilun Luo, Ann Arbor, MI (US); Scott R. Hotz, Pinckney, MI (US); Terrence F. Alger, San Antonio, TX (US); Christopher J. Chadwell, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 16/169,966

(22) Filed: Oct. 24, 2018

(51) Int. Cl.
*F02D 35/02* (2006.01)
*F02B 51/06* (2006.01)
*H01P 5/18* (2006.01)

(52) U.S. Cl.
CPC ............ *F02D 35/023* (2013.01); *F02B 51/06* (2013.01); *F02D 35/025* (2013.01); *H01P 5/18* (2013.01)

(58) Field of Classification Search
CPC ...... F02D 35/023; F02D 35/025; F02B 51/06; F02P 23/045; H01P 5/18; H05B 6/80; H05B 6/802
See application file for complete search history.

(56) References Cited

U.S. PATENT DOCUMENTS

| 7,671,309 | B2* | 3/2010 | Kumar | F02P 23/045 |
| | | | | 123/1 R |
| 7,793,632 | B2* | 9/2010 | Idogawa | F02P 23/045 |
| | | | | 123/143 B |
| 9,677,534 | B2* | 6/2017 | Ikeda | F02B 9/00 |
| 9,867,270 | B2* | 1/2018 | Ikeda | F02P 23/045 |
| 9,964,094 | B2* | 5/2018 | Gallatz | F02B 1/04 |

* cited by examiner

*Primary Examiner* — Grant Moubry
(74) *Attorney, Agent, or Firm* — Livingston Law Firm

(57) ABSTRACT

A system and method for generating microwaves for microwave enhanced combustion (MEC) input to an MEC antenna of an internal combustion engine. The system uses a directional coupler to deliver the MEC input signal to the MEC antenna and to receive a reflected power signal from the MEC antenna. A first feedback path determines a desired frequency, based on the reflected power and using an impedance-matching controller that matches the reflected power to a desired frequency value. A second feedback path determines a power correction term. An open loop path determines a feedforward power term, as well as timing, for the MEC input signal, based on various engine conditions. The feedforward power term is corrected with the power correction term.

12 Claims, 3 Drawing Sheets

MICROWAVE ENHANCED COMBUSTION WITH DYNAMIC FREQUENCY, POWER, AND TIMING CONTROL AND WITH POWER SENSOR FOR POWER FEEDBACK

TECHNICAL FIELD OF THE INVENTION

This invention relates to internal combustion engines, and more particularly to microwave enhanced combustion.

BACKGROUND OF THE INVENTION

Recent research has shown a beneficial effect of microwave energy on the combustion processes of air-fuel mixtures. Microwave enhanced combustion (MEC) boosts combustion kinetics by accelerating flame electrons and creating radicals using microwave energy. MEC has demonstrated promising results in improving thermal efficiency and emissions for different engine platforms by improving flame speed, dilution tolerance, and combustion stability.

The MEC concept requires the combustion chamber to couple with the microwave energy field, leading to efficient energy transfer between the microwaves and the flame front as it travels across the chamber. This coupling is only achieved when the impedance of the microwave system matches the impedance of the combustion chamber.

As conventionally embodied, MEC transmits microwaves to the combustion flame only during the early combustion phase. After the first 3% to 5% of the combustion duration, around 90% of microwave energy is reflected to the transmitter before being emitted to flame. This large reflection limits MEC's ability to enhance combustion and causes device heating and potential damage.

The MEC reflection is caused by a radio frequency phenomenon known as impedance mismatch. To mitigate reflection, the impedance of the microwave transmitter should be matched to the impedance of the flame, which changes during combustion. In an internal combustion engine, an additional source of impedance variation comes from the changing volume of the combustion chamber due to the motion of the piston. Both sources of impedance variation can lead to an impedance mismatch.

Conventional MEC impedance matching devices are based on tuning screws or waveguide stubs, which are typically adjusted only before engine ignition. In addition, because the timing of the ignition event can change every engine cycle, and the optimal impedance match using conventional equipment can only occur at one fixed timing, it is difficult to ensure that an impedance mismatch will not occur in a running engine.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 1A illustrates the frequency controller of FIG. 1.

DETAILED DESCRIPTION OF THE INVENTION

The following description is directed to a control method to improve microwave enhanced combustion (MEC) by maximizing microwave transmission efficiency for the evolving flame based on electrical impedance within the combustion chamber. The method is based on the recognition that after ignition, as the in-cylinder air-fuel mixture transforms to flame, its impedance changes dramatically from insulative to dielectric/conductive, and that other changes occur within the combustion chamber. The impedance of the MEC transmitter is matched to the combustion chamber using a real-time feedback loop for frequency control. Power control is implemented with both a feedback loop and an open (feedforward) loop that bases the desired power on engine conditions. The open loop also uses engine conditions for timing control.

As stated in the Background, conventional MEC impedance matching is performed before engine combustion, and do not change impedance during combustion. In other words, conventional MEC mechanically sets an impedance matching device for one combustion condition, which remains static throughout engine operation. Furthermore, even if dynamic impedance matching were attempted, the mechanical devices that are used are not fast enough to match changing impedance within the cylinder. The inability of current MEC processes to match impedance during combustion significantly limits the microwave energy transmitted to combustion.

An MEC impedance matching process should account for at least three factors. A first factor is changes in impedance with different environmental conditions, such as altitude, fuel type, or temperature. A second factor is changes in impedance with different engine operating conditions, such as varying engine speed and load as set by the driver. A third factor is changes in impedance within the split-second period of combustion.

Figure 1:
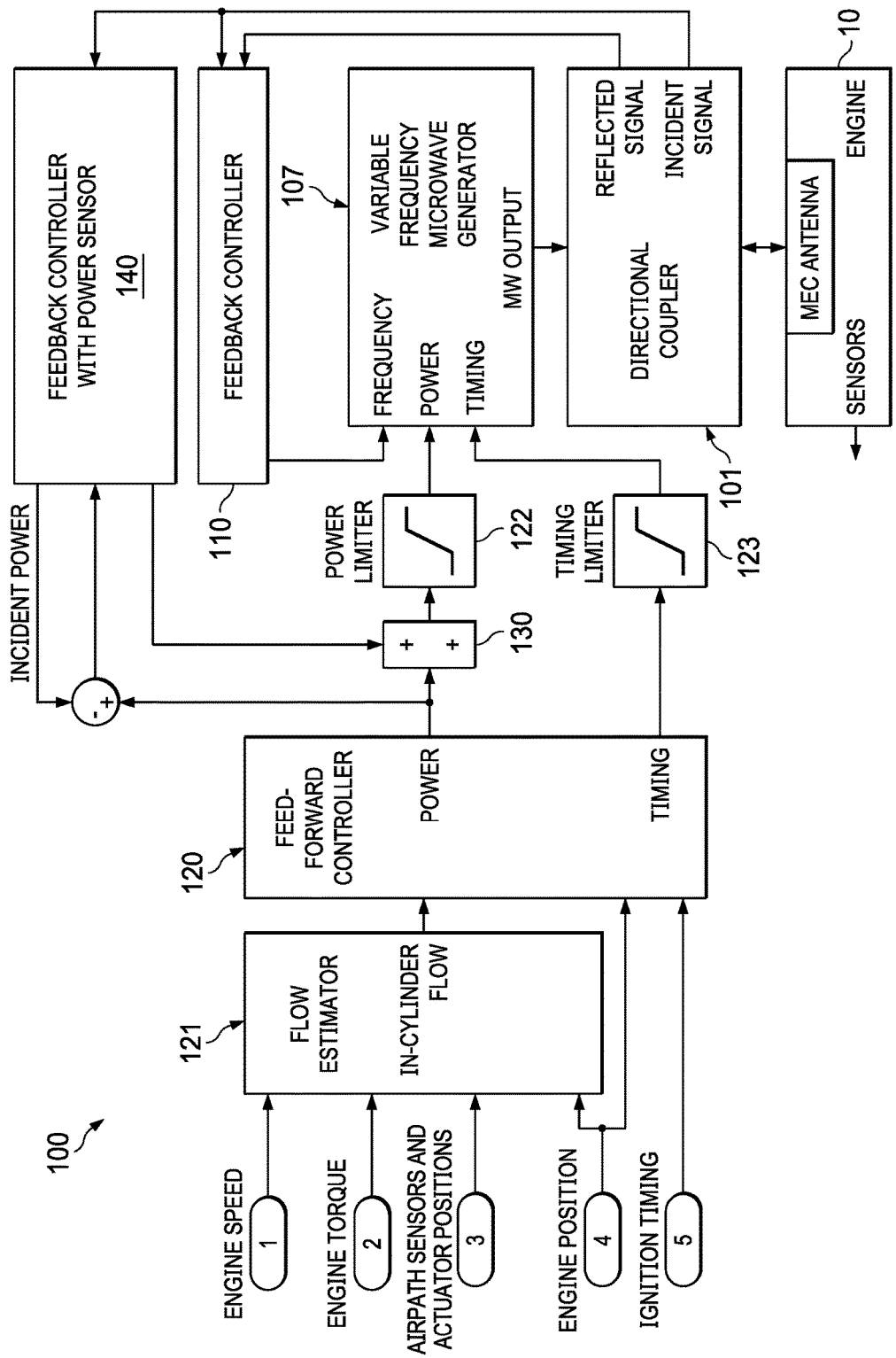
FIG. 1 illustrates an MEC control process in accordance with the invention.

FIG. 1 illustrates a microwave enhanced combustion (MEC) control system 100 with real-time frequency, power and timing control for a transmitted MEC signal. System 100 is assumed to have appropriate hardware and programming for the tasks described herein. It may be implemented within an engine control unit or as a separate device.

Engine 10 is an internal combustion engine, and is assumed to have an MEC antenna and various sensors for detecting engine conditions, as described herein. These engine conditions include at least engine position, and may also include engine speed, engine torque, ignition timing, and in-cylinder pressure and temperature. Sensors for other engine conditions such as airpath sensors, and actuator position sensors may also be used, with their data contributing to engine condition data as described herein.

Engine 10 may be any internal combustion engine, including gasoline, natural gas, dual fuel and diesel engines, burners and jet engines. It is assumed that engine has at least one combustion chamber, whose combustion conditions are referred to herein a "in-cylinder" conditions.

Feedback Path for Frequency Control

For frequency control of the MEC input signal, MEC control system 100 uses a feedback path with a feedback controller 110. A directional coupler 106 receives both the reflected signal from the MEC antenna and delivers the incident signal. It delivers the reflected signal to the feedback controller 110, which determines a desired frequency based on the reflected signal. As explained below, feedback controller 110 operates such that changes in the reflected power result in changes of frequency of the delivered MEC microwave signal in order to minimize the reflected power.

The method described herein is performed on a continuous basis during operation of engine 10. The "current" values described below represent data acquired in real time as engine operating conditions may or may not change.

FIG. 1A illustrates feedback controller 110. A phase and amplitude detector 102 receives the reflected and incident signals from the MEC antenna via directional coupler 101. It uses these signals to determine phase and amplitude data associated both of these signals, and delivers this data to impedance calculator 103. Phase and amplitude detector 102 may be implemented with commercially available solid-state integrated circuit devices.

Impedance calculator 103 uses the phase and amplitude data to estimate the in-cylinder impedance. An impedance-frequency mapper 104 then matches this impedance to a feedback frequency term. The calculation of in-cylinder impedance and matching of in-cylinder impedance to frequency may be performed with various algorithms, models, or mappings designed to select a frequency that will minimize impedance mismatch. For example, a microwave model of the MEC antenna, combustion chamber, and flame could be constructed and used to calculate its impedance, which is then matched to a reflection-reducing frequency. Impedance-frequency mapper 104 may be implemented with a proportional-integral-derivative (PID) controller, or a fuzzy controller.

The output of the impedance-frequency mapper 104 is delivered to a frequency limiter 105. This limits the desired frequency to a frequency that is within the range of microwave generator 107. The result is the "desired frequency" for output from microwave generator 107.

The desired frequency is delivered to variable frequency microwave generator 107. Generator 107 generates microwaves in forms of continuous wave (CW) or pulses with its output frequency determined as described above. Generator 107 provides the microwave output to the MEC antenna of engine 10 via directional coupler 101.

Figure 2:
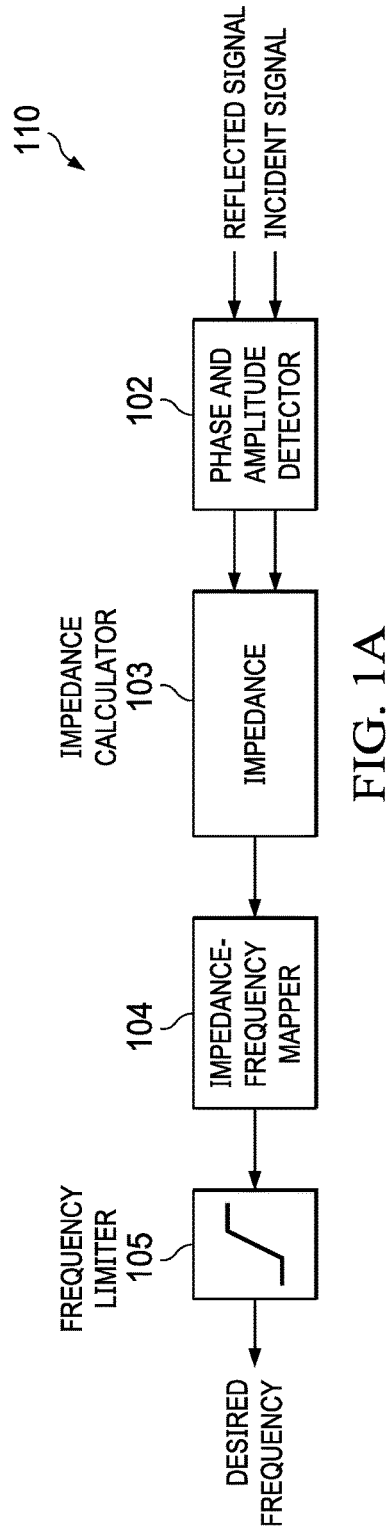
FIG. 2 illustrates how the impedance within the combustion chamber can be calculated from forward and reflected voltages and currents.

FIG. 2 illustrates how the impedance of the flame and combustion can be calculated from the forward and reflected voltages or currents. In Equations 1-3, Z is the impedance of the flame and combustion, and Γ is the reflection coefficient. $Z_0$ is the characteristic impedance of the transmission line, which typically remains constant over the operating frequency range. $V_{Reflected}$ and $V_{Incident}$ are the reflected and incident microwave voltage signals, respectively. $I_{Reflected}$ and $I_{Incident}$ are the reflected and incident microwave current signals, respectively. Their amplitudes and phases are measured by phase and amplitude detector 102 using microwave circuits, such as a quadrature amplitude modulation (QAM) demodulator.

Feedback Path for Power Control

Referring again to FIG. 1, a feedback controller (for power) 140 determines a power correction value used to determine the desired power for the MEC input signal. Controller 140 has a power sensor that receives and directly measures the incident power and provides an incident power value. The incident power is combined with a feedforward power value (described below) to determine a power setpoint.

Feedback controller 140 uses the power setpoint to determine a power correction value. The correction value and the feedforward power value then determine the desired power for the MEC input signal. This desired power is delivered to microwave generator 107.

Open Loop Power and Timing Control Path

An open loop power term, as well as the timing, of the MEC signal to be delivered to the MEC antenna are derived from an open-loop (feedforward) control path. Various engine conditions are used as input data to a feedforward controller 120, which receives the engine condition data and maps this data to desired power and desired timing values for delivery to the MEC microwave generator 107.

For MEC power control, a power term is determined and adjusted with the feedback term described above. For this power term, open-loop control tables of feedforward controller 120 rapidly set the delivered power close to an optimum. For MEC timing control, timing for delivery of microwaves at the optimal moments for each combustion event achieves optimum MEC performance in the presence of changing engine and environmental conditions.

To reduce power consumption while maintaining performance, the MEC generator 107 could also generate microwaves in pulsed form. In this case, control system 100 determines pulse parameters, such as pulse width and duty cycle.

The various inputs to controller 120 may be any combination of in-cylinder flow, engine position, and ignition timing. As explained below in connection with FIG. 3, additional data representing in-cylinder composition and density may also be estimated and input to controller 120. It is expected that at least engine position would be required as an input to controller 120.

For in-cylinder flow, a flow estimator 121 estimates in-cylinder flow from engine speed, engine torque, air flow, and engine position. Air flow data may be derived from various airpath sensors and actuator positions.

For the desired power, the desired power value determined by controller 120 is adjusted with a correction term from feedback controller 140, as described above.

A power limiter 122 may be used to ensure that the desired power is within the range of generator 107. Similarly, a timing limiter 123 may be used to ensure that the desired timing parameters are within the range of microwave generator 107. Generator 107 then generates microwaves with the desired frequency, power, and timing to the MEC antenna.

Figure 3:
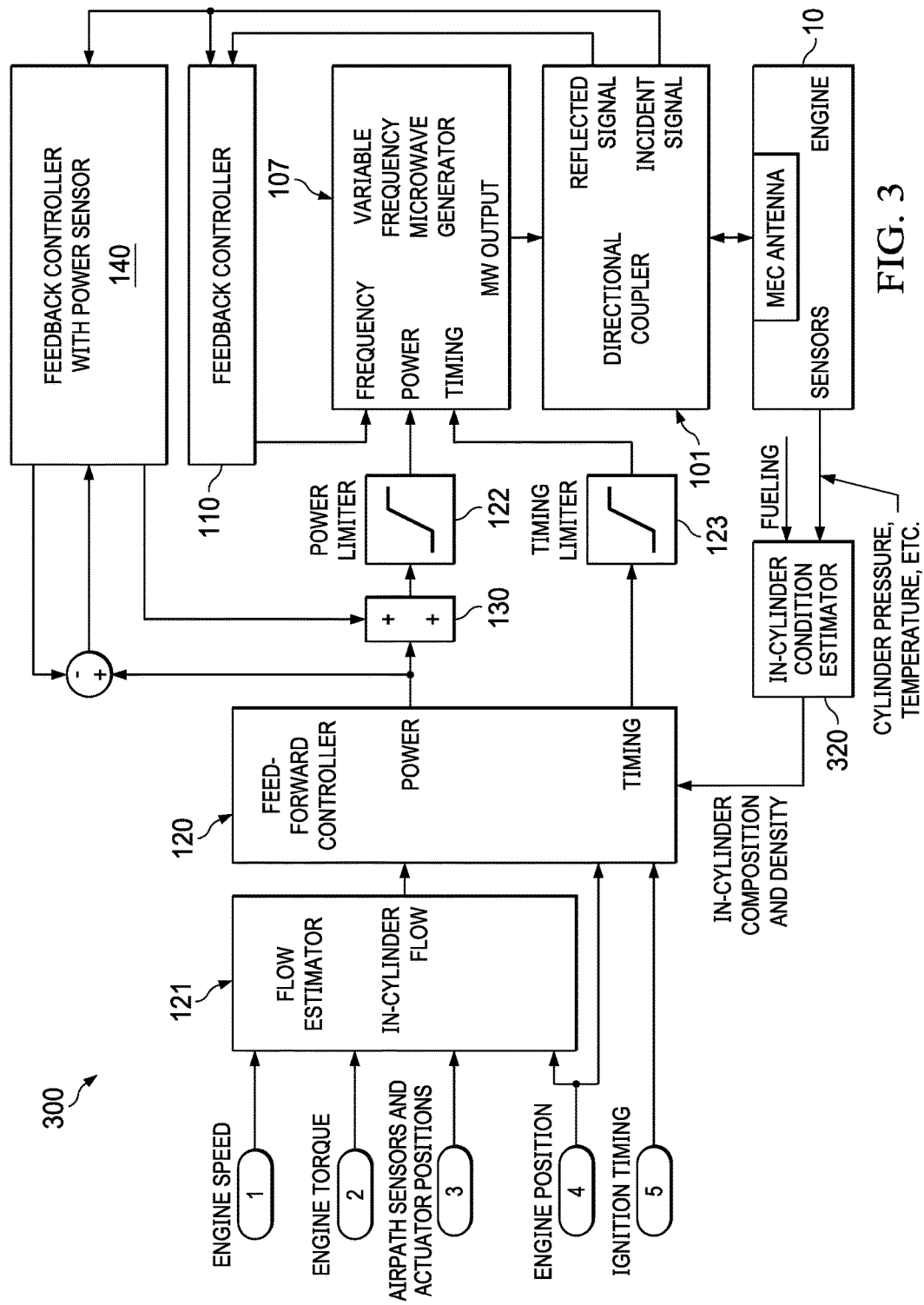
FIG. 3 illustrates the MEC control process of FIG. 1, with an additional process for estimating in-cylinder composition and density for input to the power and timing control process.

FIG. 3 illustrates an MEC control system 300, which is the same as MEC control system 100, but with the addition of an additional in-cylinder condition estimator 320 for estimating in-cylinder composition and density. This composition and density data is then used as additional input to controller 120.

In-cylinder condition estimator 320 receives input such as cylinder pressure and cylinder temperature from appropriate sensors installed in engine 10. Current fueling mass input may be received from the engine's fueling controller. The output of process 320 is data representing in-cylinder composition and density.

Control System Calibration

Referring to both FIGS. 1 and 3, the mapping processes of controller 120 and estimator 320 can be calibrated from MEC experiments on dynamometers at different engine and environmental conditions. The calibration process is compatible with industry-standard engine calibration process for other types of engine control. For each engine operating point (steady-state), the microwave frequency, power, timing and pulsing are calibrated respectively, and then co-optimized together to find the best combination for combustion performance. Data from sensors, actuators and test cell instruments are recorded and processed to obtain the control tables. The estimator for in-cylinder conditions (composition, density and flow, etc.) is derived based on combustion, microwave models, and is calibrated from the data and simulation studies, such as CFD, combustion, RF and plasma simulations. Finally, the calibration process is carried out to optimize MEC for transient operating conditions.

What is claimed is:

1. A system for generating microwaves for microwave enhanced combustion (MEC) input to an MEC antenna of an internal combustion engine, the internal combustion engine further having at least one combustion cylinder, comprising:
    a microwave generator configured to generate an incident signal, the incident signal having a desired frequency and desired power;
    a directional coupler for delivering the incident signal to the MEC antenna and for receiving a reflected signal from the MEC antenna;
    a frequency feedback path comprising a feedback controller configured to receive the incident signal and the reflected signal from the directional coupler, to estimate impedance within the cylinder, to match the impedance to a desired frequency value, and to deliver the desired frequency value to the microwave generator;
    a power feedback path configured to measure a power value of the incident signal and to determine a power correction value based on the power value;
    an open loop control path comprising a feedforward controller that receives engine data and matches the engine data to a desired power;
    wherein the engine data comprises at least one or more of the following engine conditions: engine position or ignition timing; and
    a desired power adjuster configured to correct the desired power with the power correction value and to deliver the corrected desired power to the microwave generator.

2. The system of claim 1, further comprising a flow estimator for estimating in-cylinder flow, based on one or more of the following parameters: engine speed, engine torque, air path data, and engine position; and wherein the engine data further comprises in-cylinder flow data.

3. The system of claim 1, wherein the incident signal further has one or more desired timing parameters, and wherein the feedforward controller is further configured to determine at least one timing parameter based on the engine data.

4. The system of claim 3, wherein the incident signal is a pulsed signal and the timing parameter is at least one of: pulse width or duty cycle.

5. The system of claim 1, wherein the open loop control path further comprises an in-cylinder estimator configured to receive in-cylinder data, to estimate in-cylinder composition and density data, and to deliver the in-cylinder composition and density data to the controller, and wherein the engine data further comprises in-cylinder composition and density.

6. The system of claim 5, wherein the in-cylinder data comprises at least cylinder pressure or cylinder temperature.

7. A method for generating microwaves for microwave enhanced combustion (MEC) input to an MEC antenna of an internal combustion engine, the internal combustion engine further having at least one combustion cylinder, comprising:
    using a microwave generator to generate an incident signal, the incident signal having a desired frequency and desired power;
    using a directional coupler to deliver the incident signal to the MEC antenna and for receiving a reflected signal from the MEC antenna;
    determining the desired frequency by using the incident signal and reflected signal to estimate impedance within the cylinder, and matching the impedance to a desired frequency value;
    determining the desired power by matching engine data to a desired power, wherein the engine data comprises at least one or more of the following engine conditions: engine position or ignition timing; and
    adjusting the desired power with a power correction value derived by measuring power of the incident signal.

8. The method of claim 7, further comprising estimating in-cylinder flow, based on one or more of the following parameters: engine speed, engine torque, air path data, and engine position; and wherein the engine data further comprises in-cylinder flow data.

9. The method of claim 7, wherein the incident signal further has one or more desired timing parameters, and further comprising determining at least one timing parameter by matching engine data to the desired timing parameter.

10. The method of claim 9, wherein the incident signal is a pulsed signal and the timing parameter is at least one of: pulse width or duty cycle.

11. The method of claim 7, further comprising estimating in-cylinder composition and density data, and wherein the engine data further comprises in-cylinder composition and density.

12. The method of claim 11, wherein the in-cylinder data comprises at least cylinder pressure or cylinder temperature.

* * * * *